United States Patent
Hao

(10) Patent No.: US 10,824,324 B2
(45) Date of Patent: Nov. 3, 2020

(54) TOUCH PANEL AND METHOD FOR MANUFACTURING THE SAME

(71) Applicant: Shenzhen China Star Optoelectronics Technology Co., Ltd., Shenzhen, Guangdong (CN)

(72) Inventor: Sikun Hao, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 29 days.

(21) Appl. No.: 15/329,326

(22) PCT Filed: Jan. 11, 2017

(86) PCT No.: PCT/CN2017/070897
§ 371 (c)(1),
(2) Date: Nov. 9, 2017

(87) PCT Pub. No.: WO2018/040478
PCT Pub. Date: Mar. 8, 2018

(65) Prior Publication Data
US 2018/0335916 A1 Nov. 22, 2018

(30) Foreign Application Priority Data
Aug. 31, 2016 (CN) .......................... 2016 1 0797063

(51) Int. Cl.
G06F 3/0488 (2013.01)
G06F 3/044 (2006.01)
G06F 3/041 (2006.01)
G02F 1/1333 (2006.01)
G02F 1/1343 (2006.01)

(52) U.S. Cl.
CPC ........ G06F 3/0488 (2013.01); G02F 1/13338 (2013.01); G02F 1/134363 (2013.01); G06F 3/044 (2013.01); G06F 3/0412 (2013.01); G06F 3/0416 (2013.01)

(58) Field of Classification Search
CPC .... G06F 3/0488; G06F 3/0412; G06F 3/0416; G06F 3/044; G06F 3/041; G02F 1/13338; G02F 1/134363; G02F 1/134336; G02F 1/1343; G02F 1/333
USPC ....................................................... 345/173
See application file for complete search history.

(56) References Cited

U.S. PATENT DOCUMENTS

| 8,792,060 | B2 | 7/2014 | Oh et al. | |
| 9,041,869 | B2 | 5/2015 | Kim | |
| 9,442,330 | B2 * | 9/2016 | Huo | G02F 1/13338 |
| 9,946,417 | B2 * | 4/2018 | Jiang | G02F 1/134336 |
| 10,146,359 | B2 * | 12/2018 | Tang | G09G 3/3655 |

(Continued)

FOREIGN PATENT DOCUMENTS

| CN | 103677462 A | 3/2014 |
| CN | 104123054 A | 10/2014 |
| CN | 105487735 A | 4/2016 |

*Primary Examiner* — Fred Tzeng

(57) ABSTRACT

Disclosed is a touch panel and a method for manufacturing the same. The panel includes a first metal layer formed on a substrate, a first insulation layer formed on the first metal layer, a second metal layer formed on the first insulation layer, a second insulation layer formed on the second metal layer, and an electrode layer formed on the second insulation layer.

7 Claims, 4 Drawing Sheets

(56) References Cited

U.S. PATENT DOCUMENTS

| | | | |
|---|---|---|---|
| 2008/0062147 A1 | 3/2008 | Chen et al. | |
| 2010/0128000 A1* | 5/2010 | Lo | G06F 3/044 345/174 |
| 2010/0149116 A1* | 6/2010 | Yang | G06F 3/0416 345/173 |
| 2012/0099041 A1* | 4/2012 | Xie | G02F 1/1343 349/42 |
| 2012/0133858 A1* | 5/2012 | Shin | G02F 1/13338 349/59 |
| 2013/0057511 A1* | 3/2013 | Shepelev | G06F 3/044 345/174 |
| 2014/0118277 A1* | 5/2014 | Kim | G06F 3/044 345/173 |
| 2017/0205909 A1 | 7/2017 | Hao | |
| 2018/0052542 A1 | 2/2018 | Hao | |
| 2018/0196556 A1* | 7/2018 | Xu | G06F 3/041 |
| 2018/0335863 A1* | 11/2018 | Hao | G02F 1/1333 |

* cited by examiner

TOUCH PANEL AND METHOD FOR MANUFACTURING THE SAME

CROSS-REFERENCE TO RELATED APPLICATIONS

The present application claims the priority of Chinese patent application CN 201610797063.3, entitled "Touch panel and method for manufacturing the same" and filed on Aug. 31, 2016, the entirety of which is incorporated herein by reference.

FIELD OF THE INVENTION

The present disclosure relates to touch technologies, and in particular, to a touch panel and a method for manufacturing the same.

BACKGROUND THE INVENTION

Liquid crystal display (LCD) devices are most widely-used flat-panel display devices at present and have gradually been widely used as display devices with high resolution and a color screen of all kinds of electronic equipment (mobile phones, personal digital assistants (PDA), digital cameras, screens of computers or laptops, etc.). With development and progress of LCD device technology, higher expectations have been put on display quality, appearance design, human-machine interaction, etc. of LCD devices. Thanks to characteristics like easy operation and high integrated level, touch technologies have become a focus in technology development.

Touch screens at present adopt two types of touch technologies: single-touch technology and multi-touch technology. Single-touch technology enables a touch screen to recognize and support a touch and a click of one finger each time. Multi-touch technology can break one task into two operations, one to simultaneously collect signals of multi-points, and the other to make judgment about meanings of each signal. Multi-touch technology is also known as "gesture recognition", and it enables a touch screen to recognize simultaneous clicks and touches of five fingers.

Yet, in existing touch screens, electrodes used for sensing are usually arranged below pixel electrodes, which affects touch sensitivity of panels. Besides, existing touch technologies generally cannot be applied to driving of IPS (In-Plane Switching) liquid crystal display devices.

SUMMARY OF THE INVENTION

In order to solve the above problem, the present disclosure provides a touch panel and a method for manufacturing the same, so as to increase touch sensitivity and solve the technical problem about combination of IPS technology and built-in touch electrodes.

According to one aspect of the present disclosure, a touch panel is provided. The touch panel comprises a first metal layer, a first insulation layer, a second metal layer, a second insulation layer, and an electrode layer. The first metal layer is formed on a substrate, for forming gates of thin-film transistors. The first insulation layer is formed on the first metal layer. The second metal layer is formed on the first insulation layer, for forming data lines and sources and drains of the thin-film transistors. The second insulation layer is formed on the second metal layer. The electrode layer is formed on the second insulation layer, for forming pixel electrodes and common electrodes. The common electrodes are used as touch electrodes during touch scanning. Touch leads are provided on the first metal layer and the second metal layer and are connected with the touch electrodes through via holes.

According to one embodiment of the present disclosure, the touch leads comprise driving leads and sensing leads. The driving leads are provided on the first metal layer and the sensing leads are provided on the second metal layer.

According to one embodiment of the present disclosure, the touch leads comprise driving leads and sensing leads. The sensing leads are provided on the first metal layer and the driving leads are provided on the second metal layer.

According to one embodiment of the present disclosure, the driving leads and the sensing leads are arranged perpendicular to each other.

According to one embodiment of the present disclosure, each of the sensing leads is configured to sense touch electrodes in two adjacent columns or rows and a plurality of the driving leads are configured to drive touch electrodes in a same row or column.

According to one embodiment of the present disclosure, at overlapping regions between the driving leads and the sensing leads, the touch electrodes are bridged with the driving leads and the sensing leads.

According to one embodiment of the present disclosure, during touch scanning of the panel, the driving leads are used to lead in touch driving signals, and the sensing leads are used to lead out touch driving signals.

According to one embodiment of the present disclosure, during display driving of the panel, the driving leads and the sensing leads are used as external leads of the common electrodes.

According to another aspect of the present disclosure, a method for manufacturing a touch panel is provided. The method comprises steps of: forming a first metal layer on a substrate, for forming gates of thin-film transistors and driving leads; forming a first insulation layer on the first metal layer; forming a second metal layer on the first insulation layer, for forming data lines, sources and drains of the thin-film transistors, and sensing leads; forming a second insulation layer on the second metal layer; forming an electrode layer on the second insulation layer, for forming pixel electrodes and common electrodes; and forming via holes on the electrode layer, so that the common electrodes are connected with the driving leads and the sensing leads respectively through the via holes.

According to further another aspect of the present disclosure, a method for manufacturing a touch panel is provided. The method comprises steps of: forming a first metal layer on a substrate, for forming gates of thin-film transistors and sensing leads; forming a first insulation layer on the first metal layer; forming a second metal layer on the first insulation layer, for forming data lines, sources and drains of the thin-film transistors, and driving leads; forming a second insulation layer on the second metal layer; forming an electrode layer on the second insulation layer, for forming pixel electrodes and common electrodes; and forming via holes on the electrode layer, so that the common electrodes are connected with the driving leads and the sensing leads respectively through the via holes.

The present disclosure achieves the following beneficial effects.

By using common electrodes (which are provided in a same layer as pixel electrodes) as touch electrodes, the present disclosure combines IPS technology and built-in touch electrode technology, which increases touch sensitivity and solves the technical problem about combination of IPS technology and built-in touch electrodes.

Other advantages, objectives, and features of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure or the prior art, and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

In existing touch screens, touch electrodes are usually located below pixel electrodes, which affects touch sensitivity of panels. Besides, existing touch technologies are not applicable to driving of IPS liquid crystal display devices. To solve the above problems, the present disclosure provides a touch panel which combines mutual-capacitance touch technology and IPS technology.

The touch panel comprises a first metal layer, a first insulation layer, a second metal layer, a second insulation layer, and an electrode layer. The first metal layer is formed on a substrate, for forming gates of thin-film transistors. The first insulation layer is formed on the first metal layer. The second metal layer is formed on the first insulation layer, for forming data lines and sources and drains of the thin-film transistors. The second insulation layer is formed on the second metal layer. The electrode layer is formed on the second insulation layer, for forming pixel electrodes and common electrodes. The common electrodes are used as touch electrodes during touch scanning. Touch leads are provided on the first metal layer and the second metal layer and are connected with the touch electrodes through via holes. The touch electrodes are made of ITO or metal and are provided in a same layer as the pixel electrodes, which can increase touch sensitivity.

The present disclosure combines the mutual-capacitance touch technology and the IPS technology by providing the touch leads on the first metal layer and the second metal layer, using the common electrodes as touch electrodes during touch scanning, and providing the touch electrodes and the pixel electrodes on a same surface, which increases touch sensitivity, simplifies manufacturing process, saves costs, and solves the problem of incorporating built-in touch technology into IPS technology.

In one embodiment of the present disclosure, the touch leads comprise driving leads and sensing leads. The driving leads are provided on the first metal layer and the sensing leads are provided on the second metal layer.

Figure 1:
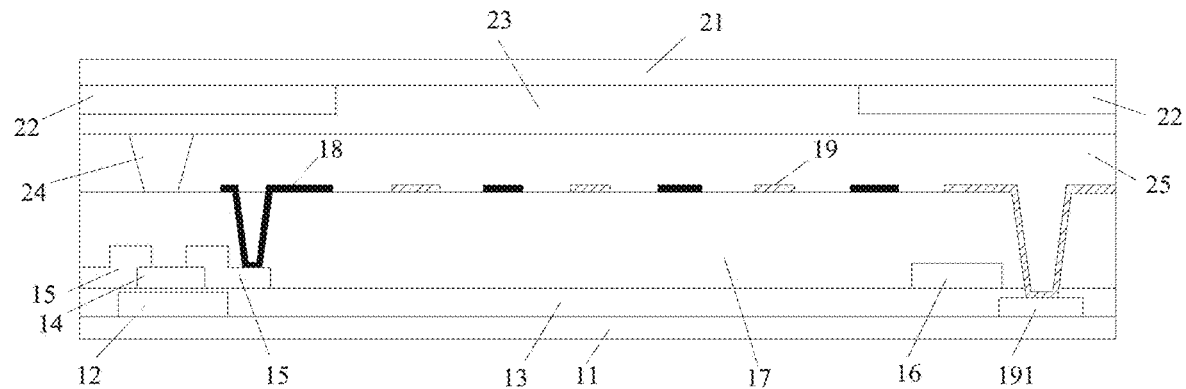
FIG. 1 schematically shows a pixel structure and driving leads during touch scanning in one embodiment of the present disclosure.

Specifically, as shown in FIG. 1, on one side of an array substrate, a first metal layer is formed on a substrate 11. The first metal layer comprises gates 12 and driving leads 191. A first insulation layer 13 is formed on the first metal layer. A second metal layer is formed on the first insulation layer. The second metal layer comprises data lines 16 and sources and drains 15 of thin-film transistors. An active layer 14 of the thin-film transistors is formed before formation of the second metal layer. A second insulation layer 17 is further formed on the second metal layer. An electrode layer is formed on the second insulation layer. The electrode layer comprises pixel electrodes 18 and common electrodes 19 which are arranged at intervals. The common electrodes are used as touch electrodes during touch scanning. The driving leads are connected with touch electrodes through via holes. On one side of a color filter substrate, black matrices 22 are provided on a substrate 21. Color filters 23 are provided on the black matrices. Spacers 24 are provided on the color filters. Liquid crystal molecules 25 are provided between the color filter substrate and the array substrate.

Figure 3:
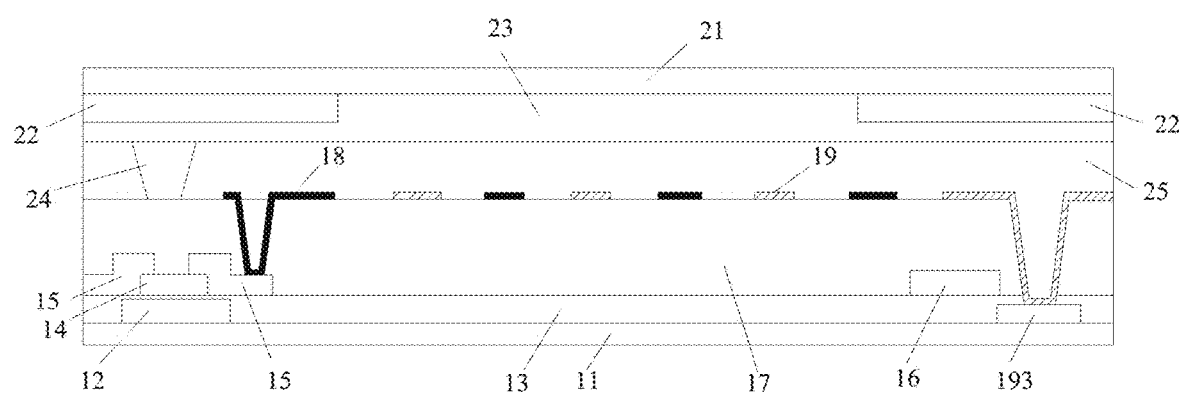
FIG. 3 schematically shows a pixel structure and sensing leads during touch scanning in one embodiment of the present disclosure.

As shown in FIG. 3, a first metal layer is formed on a substrate 11. The first metal layer comprises gates 12. A first insulation layer 13 is formed on the first metal layer. A second metal layer is formed on the first insulation layer. The second metal layer comprises data lines 16, sources and drains 15 of thin-film transistors, and sensing leads 193. An active layer 14 of the thin-film transistors is formed before formation of the second metal layer. A second insulation layer 17 is further formed on the second metal layer. An electrode layer is formed on the second insulation layer, and the electrode layer comprises pixel electrodes 18 and common electrodes 19 which are arranged at intervals. The common electrodes are used as touch electrodes during touch scanning. The sensing leads 193 are connected with touch electrodes through via holes.

In one embodiment of the present disclosure, the sensing leads 193 can also be provided on the first metal layer with the driving leads 191 provided on the second metal layer.

Figure 7:
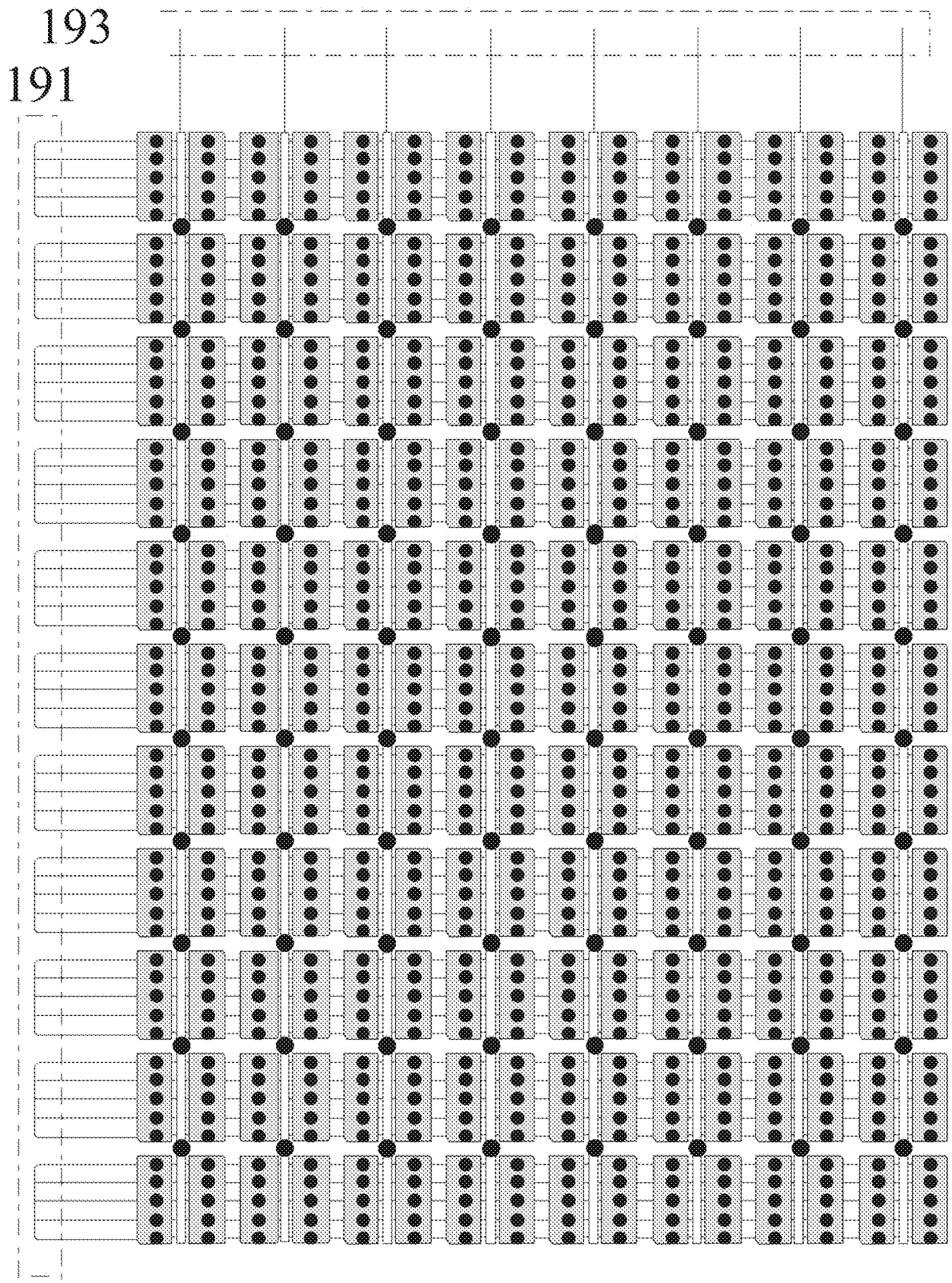
FIG. 7 schematically shows a structure of an active area and a structure of external leads during touch scanning in one embodiment of the present disclosure.

In one embodiment of the present disclosure, the driving leads and the sensing leads are arranged perpendicular to each other. Specifically, as shown in FIG. 7, a plurality of driving leads 191 are arranged in parallel; a plurality of sensing leads 193 are arranged in parallel; and the driving leads and the sensing leads are arranged perpendicular to each other.

In one embodiment of the present disclosure, one sensing lead is configured to sense touch electrodes in two adjacent columns or rows and a plurality of driving leads are configured to drive touch electrodes in a same row or column. Specifically, as shown in FIG. 7, one sensing lead 193 senses touch electrodes in two adjacent columns and a plurality of driving leads drive touch electrodes in a same row.

Figure 2:
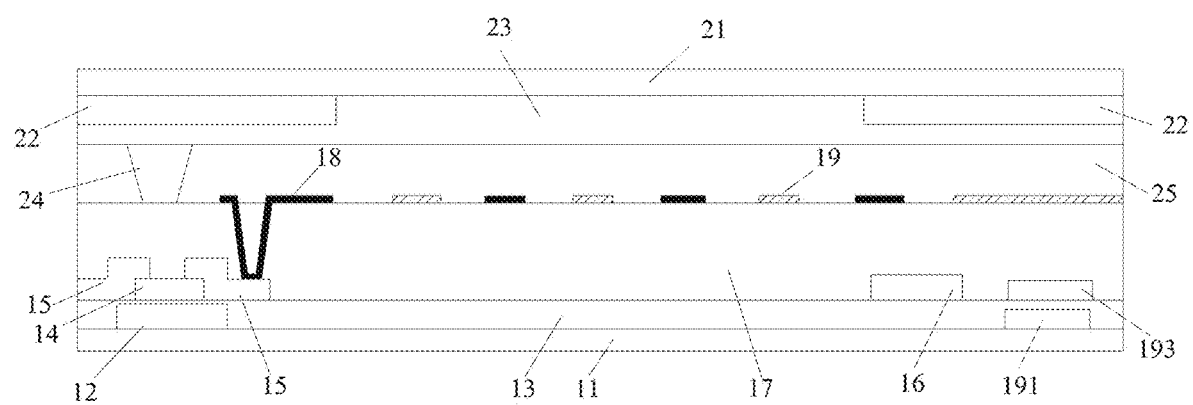
FIG. 2 schematically shows a pixel structure and bridging of driving leads during touch scanning in one embodiment of the present disclosure.
Figure 4:
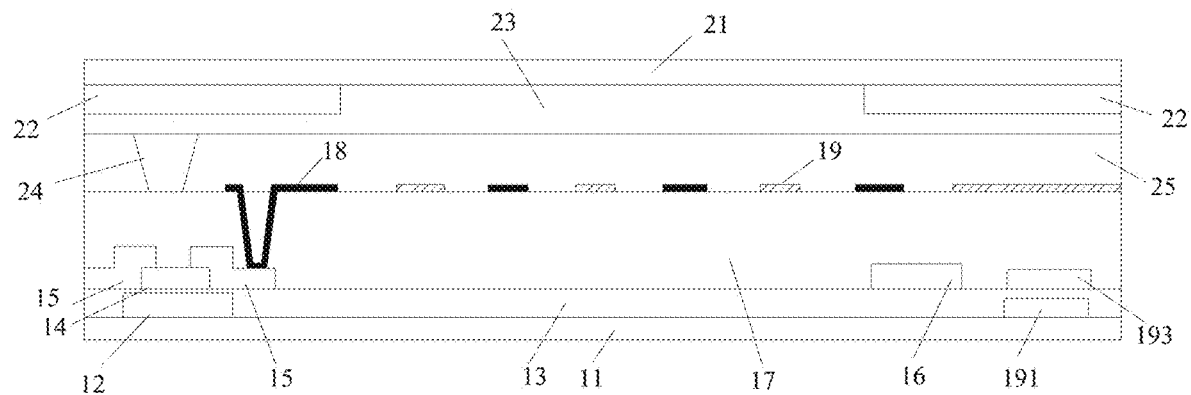
FIG. 4 schematically shows a pixel structure and bridging of sensing leads during touch scanning in one embodiment of the present disclosure.

In one embodiment of the present disclosure, the touch electrodes are bridged with the driving leads and the sensing leads respectively at overlapping regions between the driving leads and the sensing leads. Specifically, as shown in FIG. 2 and FIG. 4, the driving leads 191 and the sensing leads 193 cannot be connected to the touch electrodes through via holes due to overlapping of the driving leads 191 and the sensing leads 193. Thus, a bridge connection is made at each of these regions. In other words, no via hole is formed at these regions.

In one embodiment of the present disclosure, during touch scanning of the panel, the driving leads are used to lead in touch driving signals and the sensing leads are used to lead out touch driving signals. Specifically, as shown in FIG. 7, squares in the figure stand for touch electrodes in an active area AA, and one square stands for one touch electrode. The squares are not connected with each other. The driving leads 191 used to connect the touch electrodes in FIG. 7 are formed from the first metal layer. Dots on the squares stand for positions where the driving leads 191 and the touch electrodes which are provided in a same layer as the pixel electrodes are connected. The sensing leads 193 that are connected with the touch electrodes are formed from the second metal layer. Dots on elongated strips along the sensing leads stand for positions where the sensing leads 193 and the touch electrodes which are provided in a same layer as the pixel electrodes are connected. No data line or pixel electrode is shown in FIG. 7.

Figure 5:
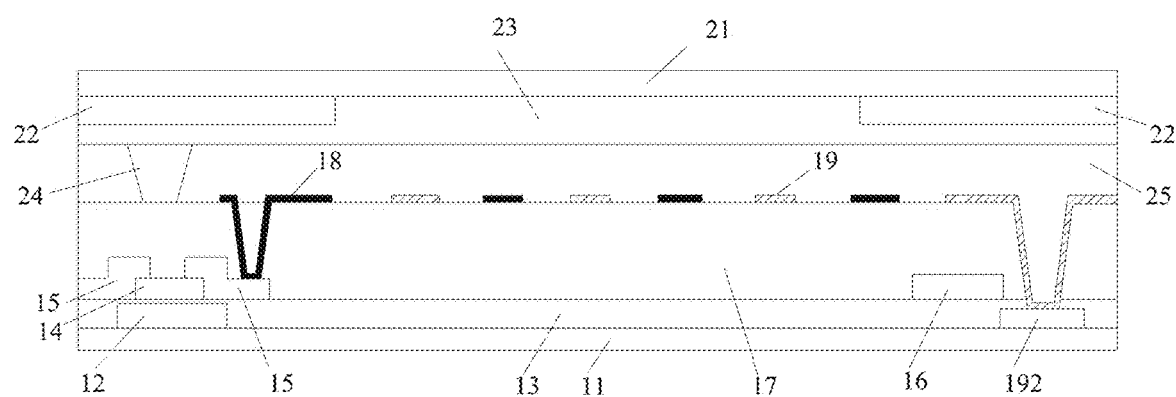
FIG. 5 schematically shows a structure in which external leads are connected with common electrodes during panel driving in one embodiment of the present disclosure.
Figure 6:
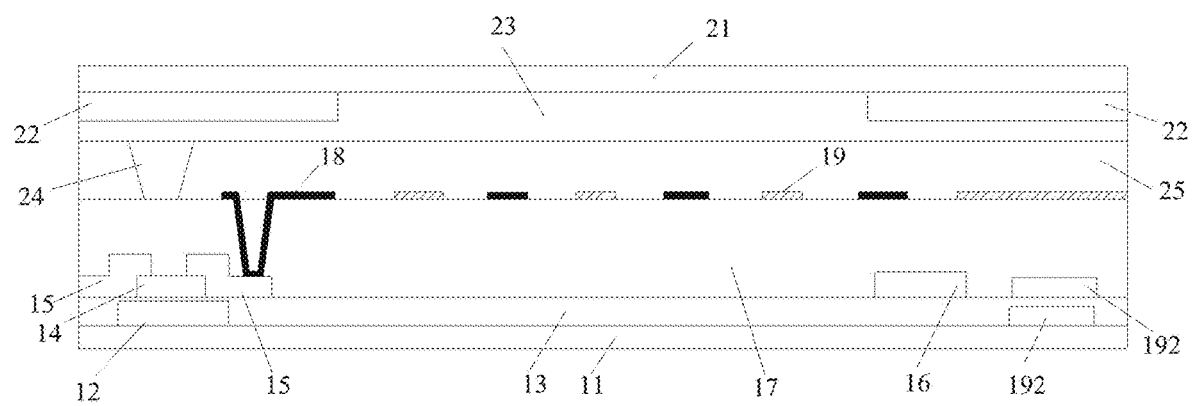
FIG. 6 schematically shows a structure in which external leads are bridged with common electrodes during panel driving in one embodiment of the present disclosure.
Figure 8:
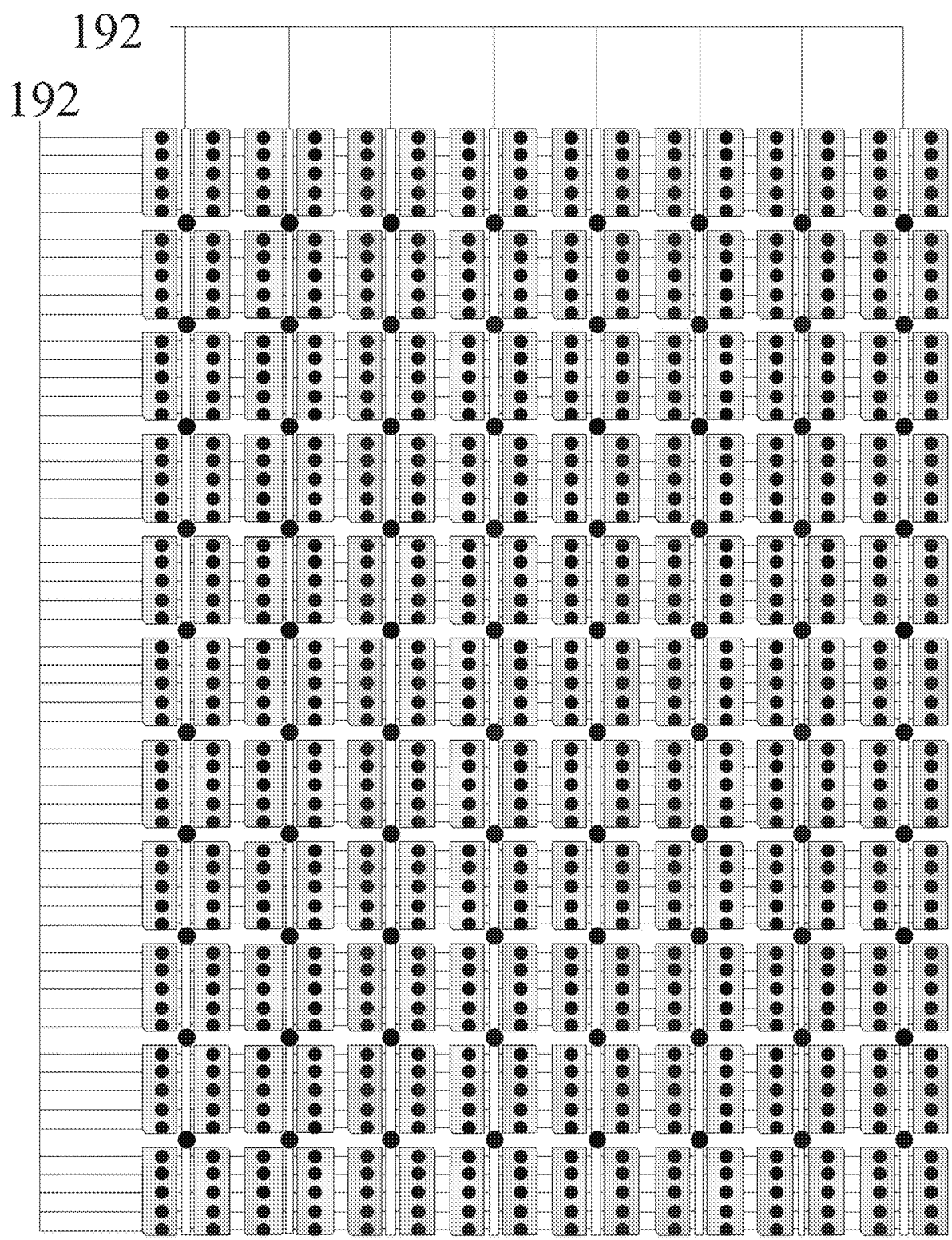
FIG. 8 schematically shows a structure of an active area and a structure of external leads during panel driving in one embodiment of the present disclosure.

In one embodiment of the present disclosure, during display driving of the panel, the driving leads and the sensing leads are used as external leads of the common electrodes. Specifically, as shown in FIG. 8, squares in the figure are used as touch electrodes during touch scanning but now as common electrodes of the active area. AA during display driving. The driving leads 191 which are used as touch electrodes during touch scanning, are now used as external leads 192 of the common electrodes, as shown in FIG. 5. The sensing leads 193 which are used as touch electrodes during touch scanning, are now used as external leads 192 of the common electrodes, as shown in FIG. 6.

According to another aspect of the present disclosure, a method for manufacturing a touch panel is provided. The method comprises steps of: forming a first metal layer on a substrate, for forming gates of thin-film transistors and driving leads; forming a first insulation layer on the first metal layer, the first insulation layer used as a gate insulation layer; forming a second metal layer on the first insulation layer, for forming data lines, sources and drains of the thin-film transistors, and sensing leads; forming a second insulation layer on the second metal layer; forming an electrode layer on the second insulation layer, for forming pixel electrodes and common electrodes; and forming via holes on the electrode layer, so that the common electrodes are connected with the driving leads and the sensing leads respectively through the via holes.

According to further another aspect of the present disclosure, a method for manufacturing a touch panel is provided. The method comprises steps of: forming a first metal layer on a substrate, for forming gates of thin-film transistors and sensing leads; forming a first insulation layer on the first metal layer, the first insulation layer used as a gate insulation layer; forming a second metal layer on the first insulation layer, for forming data lines, sources and drains of the thin-film transistors, and driving leads; forming a second insulation layer on the second metal layer; forming an electrode layer on the second insulation layer, for forming pixel electrodes and common electrodes; and forming via holes on the electrode layer, so that the common electrodes are connected with the driving leads and the sensing leads respectively through the via holes.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A touch panel, comprising:
    a first metal layer, formed on a substrate, for forming gates of thin-film transistors;
    a first insulation layer, formed on the first metal layer;
    a second metal layer, formed on the first insulation layer, for forming data lines and sources and drains of the thin-film transistors;
    a second insulation layer, formed on the second metal layer, and
    an electrode layer, formed on the second insulation layer, for forming pixel electrodes and common electrodes,
    wherein the common electrodes are used as touch electrodes during touch scanning, and touch leads are provided on the first metal layer and the second metal layer and are connected with the touch electrodes through via holes;
        wherein the touch leads comprise driving leads and sensing leads arranged below the common electrodes and connected with the common electrodes through the via holes, wherein the driving leads are provided on the first metal layer and the sensing leads are provided on the second metal layer, or the sensing leads are provided on the first metal layer and the driving leads are provided on the second metal layer.

2. The panel according to claim 1, wherein the driving leads and the sensing leads are arranged perpendicular to each other.

3. The panel according to claim 2, wherein each of the sensing leads is configured to sense touch electrodes in two adjacent columns or rows, and a plurality of the driving leads are configured to drive touch electrodes in a same row or column.

4. The panel according to claim 3, wherein at overlapping regions between the driving leads and the sensing leads, the touch electrodes are bridged with the driving leads and the sensing leads.

5. The panel according to claim 2, wherein at overlapping regions between the driving leads and the sensing leads, the touch electrodes are bridged with the driving leads and the sensing leads.

6. The panel according to claim 1, wherein during touch scanning of the panel, the driving leads are used to lead in touch driving signals, and the sensing leads are used to lead out touch driving signals.

7. The panel according to claim 1, wherein during display driving of the panel, the driving leads and the sensing leads are used as external leads of the common electrodes.

\* \* \* \* \*